United States Patent
Bernsen

(10) Patent No.: US 7,209,562 B2
(45) Date of Patent: Apr. 24, 2007

(54) METHOD AND APPARATUS FOR DECRYPTING ENCRYPTED DATA STORED ON A RECORD CARRIER

(75) Inventor: Johannes Arnoldus Cornelis Bernsen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 750 days.

(21) Appl. No.: 10/140,504

(22) Filed: May 7, 2002

(65) Prior Publication Data

US 2002/0168070 A1  Nov. 14, 2002

(30) Foreign Application Priority Data

May 9, 2001  (EP) .................................. 01201692

(51) Int. Cl.
*H04L 9/11* (2006.01)
(52) U.S. Cl. ....................... 380/277; 713/171; 380/228
(58) Field of Classification Search ................ 713/156, 713/172, 171; 380/277, 4; 705/51
See application file for complete search history.

(56) References Cited

U.S. PATENT DOCUMENTS

| 5,784,460 | A | * | 7/1998 | Blumenthal et al. | ........ | 705/51 |
| 5,809,006 | A | * | 9/1998 | Davis et al. | ............. | 369/47.49 |
| 6,813,709 | B1 | * | 11/2004 | Benardeau | .................. | 713/172 |
| 6,857,071 | B1 | * | 2/2005 | Nakae | ........................ | 713/156 |
| 2001/0042043 | A1 | * | 11/2001 | Shear et al. | .................. | 705/51 |
| 2002/0023219 | A1 | | 2/2002 | Treffers et al. | ............. | 713/176 |
| 2003/0095664 | A1 | * | 5/2003 | Asano et al. | ................ | 380/277 |

FOREIGN PATENT DOCUMENTS

EP  0802527 A1  10/1997
WO  WO9743761  11/1997

* cited by examiner

*Primary Examiner*—Gilberto Barrón, Jr.
*Assistant Examiner*—Fikremariam Yalew
(74) *Attorney, Agent, or Firm*—Michael E. Belk

(57) ABSTRACT

The invention relates to a method for decrypting encrypted data stored on a record carrier, to a corresponding method for encrypting data and to corresponding apparatuses. In order to provide a high level of protection for data stored on a record carrier and to prevent that data stored on different record carriers can be decrypted after a decryption algorithm has become known the method for decrypting encrypted data according to the invention comprises the following steps:
a) generating a decryption key (DK) using a unique carrier identifier (UDI) associated with said record carrier, a hidden key (HK) stored in a hidden channel on said record carrier and a password key (PK), and
b) decrypting said encrypted data stored on said record carrier using said generated decryption key (DK).

20 Claims, 2 Drawing Sheets

Figure 1:
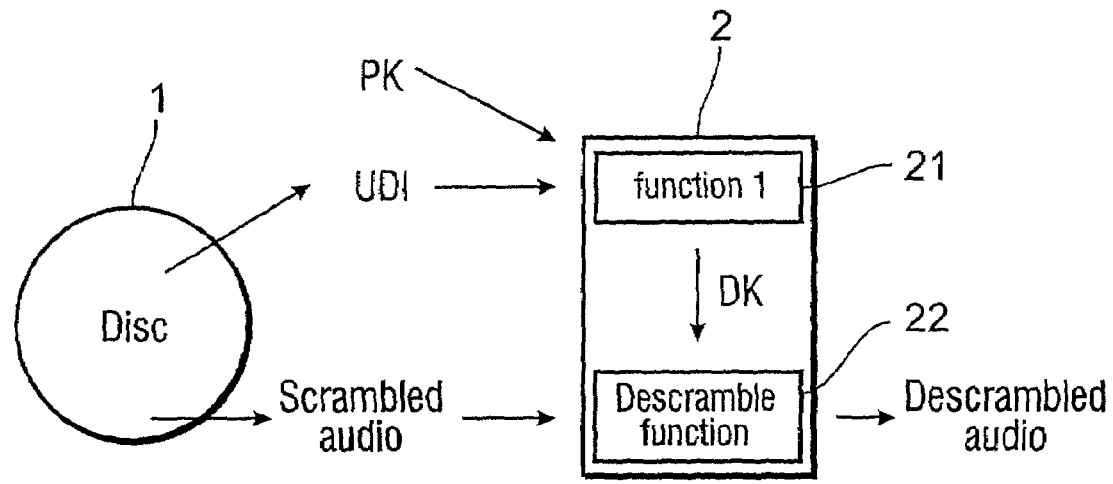

METHOD AND APPARATUS FOR DECRYPTING ENCRYPTED DATA STORED ON A RECORD CARRIER

The invention relates to a method for decrypting encrypted data stored on a record carrier as well as to a corresponding apparatus. Further, the invention relates to a method for encrypting data to be stored on a record carrier and a corresponding apparatus. Still further, the invention relates to a record carrier for storing data in encrypted form.

Music and video publishers use encryption to protect their contents which are published, e. g. on optical discs. In the case of e. g. DVD-video, the decryption keys are stored on the disc itself, be it in a secret way. However, if the proper key to decrypt a certain title is become known somehow, then all discs with the same title can be decrypted. It is even worse, when a so called player key which is stored on a disc becomes known, since all discs which use that particular player key can be decrypted then, i. e. not just one certain disc, but many titles can be decrypted.

Music and video publishers and also software producers might want to bring out pre-pressed discs, of which a certain portion can be listened to, watched and perhaps copied from freely. This portion is meant to be like this for generating consumer interest in the disc. The rest of the disc contains the audio and video data and is encrypted. This kind of disc could be sold at a very low price, so people can come into contact with this material at a low financial risk. When they want to have access to the complete disc, they can buy the key for decryption of the remainder of the disc. This key for decryption should be unique for the disc, since otherwise all discs with the same title can be decrypted with that particular key and not many keys will be sold. It may also be possible that different decryption keys are required for different parts of the disc.

The most common way for purchased decryption keys for pre-pressed discs is to store them in the player of the customer. This has the disadvantage that only that single player can play the disc. However, consumers will want to play their discs in more than one place, e. g. in the car, in the bedroom, at a friend's place etc. It might be even worse, when the player breaks down beyond repair, since then new keys have to be bought.

Another solution is to provide some (re-)writable portion on a pre-pressed disc and store the purchased keys, i. e. the password keys which are required for decryption, on the disc, but this extra (free) writable portion is expensive.

Yet another solution is known from EP 1 005 025 A1. In the system known from this document the pre-pressed discs are all required to have a unique disc ID, which is written in a burst cutting area. When a user wishes to receive a decryption key he has to send the unique disc ID to the provider or retailer. The provider can, after payment, send back a password, which may also be called a password key or a purchased key. The player can compute the decryption key from this password key and the unique disc ID.

A problem that may arise with this system is, however, that both the unique disc ID and the password key are known in principle. Therefore, the algorithm to create the real decryption key from the unique disc ID and the password key must be kept as a secret and should preferably be implemented within one IC. If this algorithm would become known, then the decryption key for a title can be obtained by buying one key and combining it with this algorithm and with the unique disc ID. Reverse engineering of hardware players might be difficult, but reverse engineering of software players and retrieving player keys is not unusual.

Further, according to EP 1 005 025 A1 it is proposed to use public cryptography for sending the password keys to the player of the user. A password key encrypted in this way will be in the order of 1024–2048 bits sent over an electronic network.

This may help to overcome the above-mentioned problem. However, playback can only be done by the player in which the password key is stored.

It is therefore an object of the present invention to provide methods for encrypting data to be stored on a record carrier and for decrypting encrypted data which overcome the above mentioned problems, i. e. which provide a higher level of protection of data stored on a record carrier against hacking and which makes the use of illegally retrieved keys more difficult. Further, corresponding apparatuses and a record carrier for storing data in encrypted form shall be provided according to the invention. In addition, the required keys should be easy to handle and as short as possible.

This object is achieved according to the invention by a method for decrypting encrypted data stored on a record carrier comprising the steps of:

a) generating a decryption key using a unique carrier identifier associated with said record carrier, a hidden key stored in a hidden channel on said record carrier and a password key, and b) decrypting said encrypted data stored on said record carrier using said generated decryption key.

A corresponding apparatus for decrypting encrypted data is claimed in claim 4.

According to the invention all pre-pressed discs are required to have a unique carrier identifier (also called unique disc ID). Such unique carrier identifier might be a serial number of a disc. The decryption key (also called disc key) necessary for decrypting all part of the data stored on a record carrier is generated according to the invention using this unique carrier identifier, a password key which the user can buy (a purchased key) and in addition, a hidden key. The hidden key is a key which resides on the record carrier in such a way, that existing non-compliant players cannot read it. The hidden key is therefore stored in a hidden channel on the record carrier which hidden channel can be implemented on the record carrier by different means and/or in different ways. One possibility is the use of a wobble signal, i. e. a physical variation of the track along which data are stored on the record carrier. Another possibility for a hidden channel is the use of a certain additional encoding method which is only known to compliant players so that non-compliant players cannot read data in the hidden channel.

The present invention has the main advantage that only one record carrier, e.g. only one pre-pressed disc, or parts of it can be decrypted with the password key. If the algorithm for computing the decryption key would become known, then still the decryption key cannot be computed from the unique carrier identifier and the password key. The hidden key in the hidden channel of the record carrier makes the final decryption key, which is necessary for decryption, a secret one, even when knowing the algorithm for computing the decryption key and even if the length of the password key is quite short. The unique carrier identifier makes the final decryption key unique for only one particular record carrier. The password key that can be bought makes the final decryption key available for the user.

It shall be remarked here that the invention is not limited to the protection of music or video, but does apply in general to any kind of data that can be stored on a record carrier like video software, audio, image data etc. Further the invention is not limited to a certain kind of record carriers, but can be applied to any record carrier provided for storing data thereon, e. g. optical record carriers like CDs or DVDs, mini discs, flash cards etc.

Preferred embodiments of the invention are given in the subclass. Preferably, the password keys are provided by a password key provider which might be the owner or publisher of the data, like the music or video publisher or the software producer.

In another embodiment the decryption key may not be used directly to decrypt data but might be used to decrypt an encrypted secondary decryption key like an asset key which might be encrypted in a key locker. Such secondary decryption keys might then be used to decrypt the encrypted data stored on the record carrier. This has the advantage that an additional decryption step, i. e. an additional algorithm for decryption needs to be carried out and that an additional key is necessary before content stored on the record carrier can be decrypted. The level of protection is thus further improved.

A method for encrypting data to be stored on a record carrier comprises the steps of:
a) generating a decryption key using a unique carrier identifier to be associated with said record carrier, a hidden key to be stored in a hidden channel on said record carrier and a password key, and
b) encrypting said data to be stored on said record carrier using said generated decryption key.

A corresponding apparatus for encrypting data is claimed in claim 8.

A record carrier used according to the invention for storing data in encrypted form comprises a unique carrier identifier associated with said record carrier and a hidden key stored in a hidden channel on said record carrier, wherein said unique carrier identifier and said hidden key are used together with a password key for generating a decryption key, said generated decryption key being used for decrypting said encrypted data stored on said record carrier.

Figure 2:
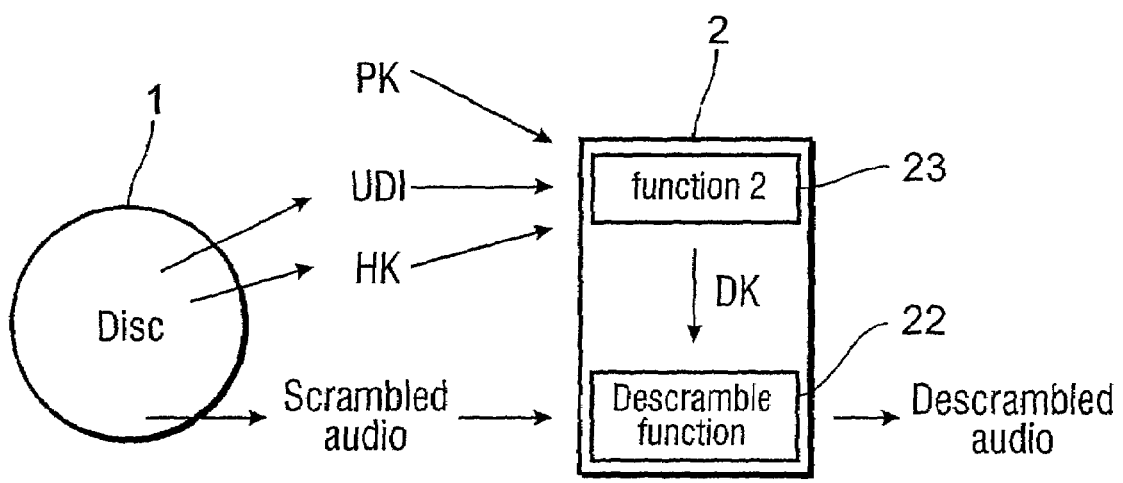
Figure 3:
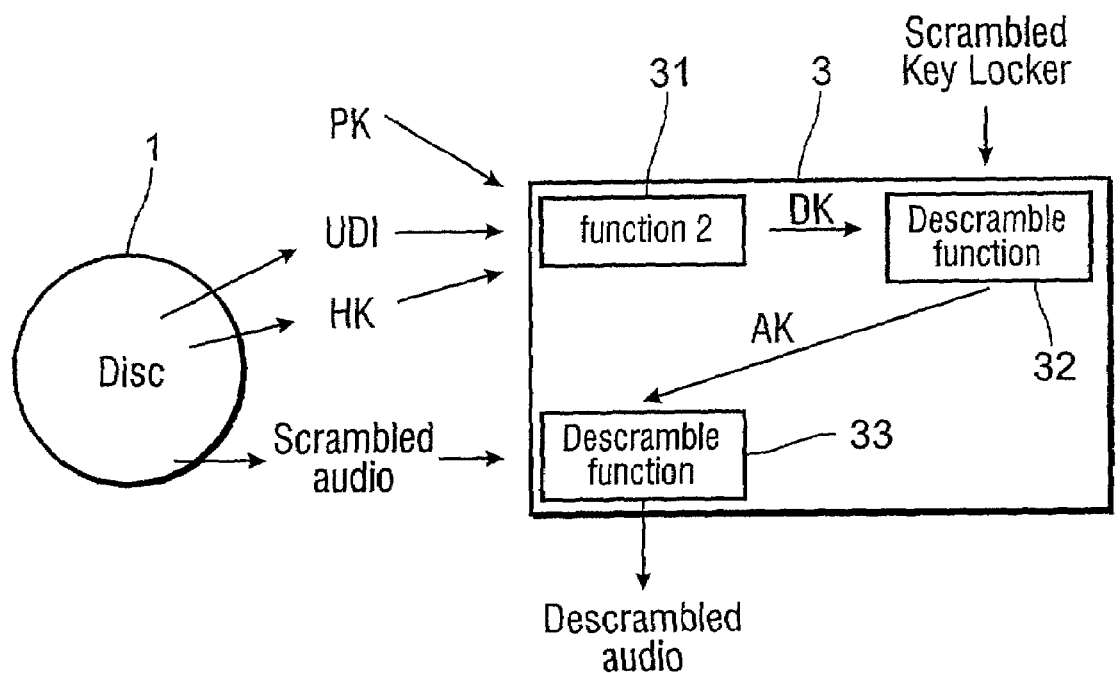
Figure 4:
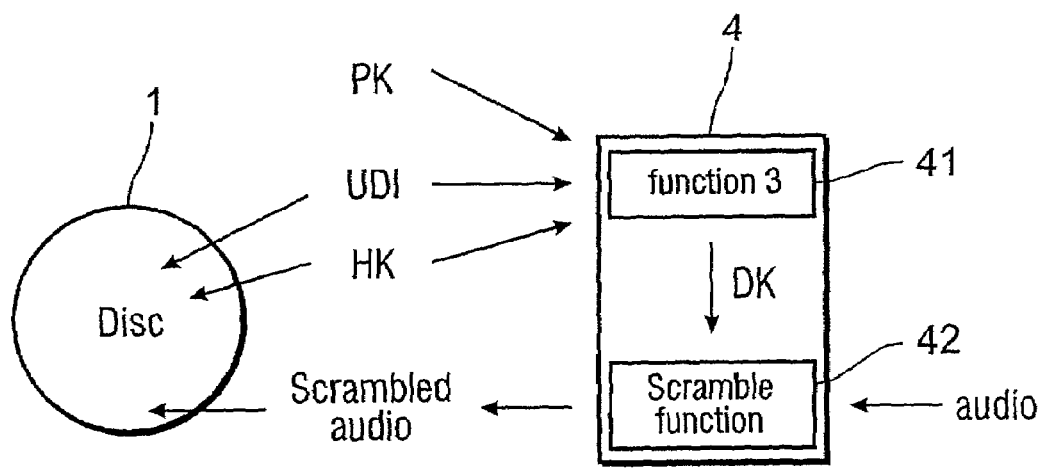

The invention will now be explained in more detail with reference to the drawings, in which FIG. 1 shows a block diagram explaining the known method for decryption, FIG. 2 shows a block diagram of a first embodiment of a method for decryption according to the invention, FIG. 3 shows a block diagram of a second embodiment of a method for decryption according to the invention, FIG. 4 shows a block diagram explaining a method for encryption according to the invention.

The block diagram of FIG. 1 explains a method for decrypting encrypted data stored on a record carrier 1, in the example an optical record carrier like a CD or DVD, as it is known from EP 1 005 025 A1. In the example shown encrypted (scrambled) audio data, like music, is stored on the disc 1. Further, a unique carrier (disc) identifier UDI is associated with the disc 1. The unique carrier identifier UDI may be a number that is unique for each individual disc. All discs with the same content have a different UDI. This number can be read from the disc, but cannot be changed. As an example a serial number printed on the surface of the disc may be used as UDI.

The scrambled audio data and the unique carrier identifier UDI are provided to a decryption apparatus 2 which may be a part of a reproduction apparatus for reproducing the audio data for replay, in particular a disc player apparatus. In addition, a password key PK is required as input to the decryption apparatus 2 in order to be able to generate a decryption key DK by use of which the scrambled audio data can be descrambled for further processing and reproduction. In order to get the password key PK the unique carrier identifier UDI has to be present to a provider or retailer providing such password keys. In addition, a payment might be required by the provider or retailer before the password key (also caller purchased key) PK will be sent to the decryption apparatus 2.

In the decryption apparatus 2 a key generating means 21 is provided which generates the decryption key DK from the unique carrier identifier UDI and the password key PK using a first algorithm (function 1). Thereafter, by use of the generated decryption key DK and by use of a descramble function a decryption means 22 is provided for decrypting the encrypted audio data into decrypted (descrambled) audio data.

As already explained above the level of protection of this method is quite low since a lot of decryption keys DK can be obtained if the decryption key generating algorithm (function 1) becomes known, e. g. by software hacking, and by buying only one password key PK. Password keys could be encrypted by public cryptography before sending it to the decryption apparatus 2. However, playback can then only be done by a player in which the password key PK is stored. Since there are also other ways to provide password keys to a decryption apparatus and since the user might also wish to replay data on other players or on more players than only one the known solution is impracticable.

According to the invention it is therefore proposed to use an additional hidden key HK as shown in FIG. 2. Therein, again an optical record carrier 1 is shown comprising a unique carrier identifier UDI and storing audio data in encrypted form. Further, a hidden key HK is stored on the disc 1 in a hidden channel which means that the hidden key HK is hidden on the disc 1 in such a way that existing (non-compliant) players cannot read it. Possible implementations of the hidden channel are the use of a wobble channel for storing data on the disc or the use of a certain encoding method for storing the hidden key on the disc 1.

In the decryption apparatus 2 there is again provided a key generating means 23 for generating the decryption key DK by use of a generation algorithm (function 2) using as input the hidden key HK, the unique carrier identifier UDI and the password key PK again provided from a key provider or retailer or even the audio data publisher or owner. The decryption key DK which is identical for all discs with the same content and which is not stored on the disc is thereafter used to decrypt the content, i. e. the scrambled audio data, stored on the disc 1 in decryption means 22.

According to the invention only one disc or parts of it can be decrypted with the password key. If the decryption key generating algorithm (function 2) would become known then still the decryption key cannot be generated from only the unique carrier identifier UDI and the password key PK since, in addition, always a certain hidden key HK is required, which cannot be read-out, but can only be read by a compliant device.

Another embodiment of the invention is shown in FIG. 3. Therein again on the disc there is stored a scrambled audio data and a hidden key HK in a hidden channel. Further, a unique carrier identifier UDI is associated with the disc 1. However, in the decryption apparatus 3 the decryption key DK generated by the decryption key generation means 31, which generation is identical to the generation shown in FIG. 2, is not directly used to decrypt the encrypted audio data. Alternatively, the decryption key DK is used to decrypt (descramble) a key locker by use of key locker decryption means 32. A key locker is a file that stores keys of different parts of a disc. It is encrypted in a key locker key. When descrambling the scrambled key locker (descramble function 2) using the generated decryption key DK an asset key AK is generated which asset key is a key that is used to scramble (encrypt) a part of the contents of the record carrier 1. Such asset keys AK are stored in the key locker. The decrypted asset key AK will then be used in the decryption means 33 to descramble the scrambled audio data (descramble function). In this embodiment, an additional level of protection is introduced by not using the decryption key directly to descramble the scrambled audio data but by first descrambling a key locker to generate a required asset key.

In general, there are many ways to transfer password keys to a decryption apparatus or a disc player comprising such a descryption apparatus. A few simple ways are:

the user might be given the keys printed on paper and he might type them into his player himself. This is not too inconvenient if one disc has only one or a few associated decryption keys (decryption keys).

The paper mentioned above might also be in the form of a sticker which he sticks onto his disc.

The sticker mentioned above can in addition to the printed key(s) also contain barcodes representing the same keys. A simple barcode reader attached to the player or incorporated in the drive can then be used for inputting the keys into the player.

Clearly, a 1024–2048 bit password key is quite long for a barcode and too long for a user to type in. However, according to the invention, also short password keys can be used since other or additional ways of protection are introduced in the inventive concept.

FIG. 4 illustrates the method of encrypting data to be stored on a disc 1. The audio data to be encrypted is provided to an encryption apparatus 4 which may be part of a disc recording apparatus. Similarly as in the decryption apparatus shown in FIG. 2 in the encryption apparatus 4 key generating means 41 are provided for generating a decryption key DK from the password key PK, the unique carrier identifier UDI and the hidden key HK. Both the unique carrier identifier UDI and the hidden key HK are already associated with the certain disc 1 or are selected and associated with the disc 1 now. The password key PK is again provided from a provider or retailer after receiving the unique carrier identifier UDI, and eventually, also the hidden key HK. The generated decryption key DK generated by a generation algorithm (function 3) is then provided to an encryption means 42 encrypting the provided audio data for storage on the disc 1. As an alternative, the encryption apparatus can also be developed further similar as the decryption apparatus shown in FIG. 3.

The invention claimed is:

1. A method for decrypting encrypted data stored on a record carrier, including the steps of:
   a) generating a decryption key (DK) using a unique carrier identifier associated with said record carrier, a hidden key stored in a hidden channel on said record carrier and a password key, and
   b) decrypting said encrypted data stored on said record carrier using said generated decryption key.

2. A method according to claim 1, characterized in tat said password key (PK) is provided, in particular sold, by a password key provider, in particular the owner or publisher of said encrypted data.

3. A method accairding to claim 1, characterized in that said generated decryption key (DK) is first used to decrypt an encrypted secondary decryption key (AK), in particular to decrypt an asset key from a key locker (KL), and that thereafter the secondary decryption key (AK), in particular the asset key, is used to decrypting said encrypted data stored on said record carrier.

4. Apparatus for decrypting encrypted data stored on a record carrier, including:
   a) key generating means for generating a decryption key using a unique carrier identifier associated with said record carrier, a hidden key (HK) stored in a hidden channel on said record carrier and a password key, and
   b) decryption means for decrypting said encrypted data stored on said record carrier using said generated decryption key.

5. Reproduction apparatus for reproducing data stored on a record carrier, in particular disc player apparatus, comprising an apparatus for decrypting according to claim 4.

6. Record carrier for storing data in encrypted form, including a unique carrier identifier associated with said record carrier and a hidden key stored in a hidden channel on said record carrier,
wherein said unique carrier identifier and said hidden key are used together with a password key for generating a decryption key, said generated decryption key being used for decrypting said encrypted data stored on said record carrier.

7. A method for encrypting data to be stored on a record carrier, including comprising the steps of:
   a) generating a decryption key using a unique carrier identifier to be associated with said record carrier, a hidden key to be stored in a hidden channel on said record carrier and a password key, and
   b) encrypting said data to be stored on said record carrier using said generated decryption key (DK).

8. Apparatus for encrypting data to be stored on a record carrier, including:
   a) key generating means for generating a decryption key using a unique carrier identifier to be associated with said record carrier, a hidden key to be stored in a hidden channel on said record carrier and a password key, and
   b) encryption means for encrypting said data to be stored on said record carrier using said generated decryption key.

9. The method of claim 1, wherein the hidden channel that stores the hidden key is a physical variation along a track of said record carrier.

10. The method of claim 1, wherein the physical variation is a wobble channel.

11. The apparatus of claim 4, wherein the hidden channel that stores the hidden key is a physical variation along a track of said record carrier.

12. The apparatus of claim 11, wherein the physical variation is a wobble channel.

13. The record carrier of claim 6 wherein the hidden channel that stores the hidden key is a physical variation along a track of said record carrier.

14. The record carrier of claim 13, wherein the physical variation is a wobble channel.

15. The method of claim 7, wherein the bidden channel that stores the hidden key is a physical variation along a track of said record carrier.

16. The method of claim 15, wherein the physical variation is a wobble channel.

17. The apparatus of claim 8, wherein the hidden channel that stores the hidden key is a physical variation along a track of said record carrier.

18. The apparatus of claim 17, wherein the physical variation is a wobble channel.

19. A method according to claim 7, characterized in that said password key is provided, in particular sold, by a password key provider, in particular the owner or publisher of said encrypted data.

20. A method according to claim 7, characterized in that said generated decryption key is first used to decrypt an encrypted secondary decryption key, in particular to decrypt an asset key from a key locker, and that thereafter the secondary decryption key, in particular the asset key, is used to decrypting said encrypted data stored on said record carrier.

\* \* \* \* \*